US010373321B2

(12) United States Patent
Lee et al.

(10) Patent No.: US 10,373,321 B2
(45) Date of Patent: Aug. 6, 2019

(54) SUN POSITION TRACKING METHOD BASED ON BLACK SUN EFFECT OF IMAGE SENSOR, COMPUTER PROGRAM STORED IN MEDIUM, AND SOLAR SENSOR USING THE SAME

(71) Applicant: RESEARCH & BUSINESS FOUNDATION SUNGKYUNKWAN UNIVERSITY, Suwon-si (KR)

(72) Inventors: Sukhan Lee, Yongin-si (KR); Rashid Saleem, Suwon-si (KR); Jaewoong Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/583,486

(22) Filed: May 1, 2017

(65) Prior Publication Data
US 2017/0323453 A1 Nov. 9, 2017

(30) Foreign Application Priority Data

May 3, 2016 (KR) ........................ 10-2016-0054442

(51) Int. Cl.
| G06T 5/00 | (2006.01) |
| G06T 5/20 | (2006.01) |
| G06T 5/50 | (2006.01) |
| G06T 7/136 | (2017.01) |
| G06T 7/246 | (2017.01) |
| G06T 7/277 | (2017.01) |
| G06T 7/292 | (2017.01) |
| H02S 20/32 | (2014.01) |

(52) U.S. Cl.
CPC .............. *G06T 7/248* (2017.01); *G06T 5/002* (2013.01); *G06T 5/20* (2013.01); *G06T 5/50* (2013.01);
(Continued)

(58) Field of Classification Search
CPC ... H02S 20/32; G06T 5/20; G06T 5/50; G06T 7/136; G06T 7/246; G06T 7/248;
(Continued)

(56) References Cited

U.S. PATENT DOCUMENTS

| 6,647,352 | B1 * | 11/2003 | Horton | .................. | G01C 21/16 |
| | | | | | 702/151 |
| 7,218,260 | B2 * | 5/2007 | Lim | ...................... | H04N 5/243 |
| | | | | | 341/118 |

(Continued)

FOREIGN PATENT DOCUMENTS

| CN | 102902975 A | * | 1/2013 |
| KR | 10-0970952 B1 | | 7/2010 |

(Continued)

OTHER PUBLICATIONS

Barnes et al. "A hemispherical sun sensor for orientation and geolocation." IEEE Sensors Journal 14.12 (2014): 4423-4433.*

(Continued)

*Primary Examiner* — Katrina R Fujita
(74) *Attorney, Agent, or Firm* — NSIP Law

(57) ABSTRACT

The present invention provides a sun position tracking method based on a black sun effect of an image sensor, a computer program including commands for causing a computer system to perform the method, and a solar sensor using the method. The sun position tracking method includes processing a plurality of images captured using a plurality of image sensors installed to capture a plurality of images of the sun irrespective of the position of the sun to estimate the center point of the black sun and track the position of the sun.

20 Claims, 12 Drawing Sheets

(52) U.S. Cl.
CPC .............. *G06T 7/136* (2017.01); *G06T 7/246* (2017.01); *G06T 7/277* (2017.01); *G06T 7/292* (2017.01); *H02S 20/32* (2014.12); *G06T 2207/20221* (2013.01); *G06T 2207/30181* (2013.01)

(58) Field of Classification Search
CPC ..................... G06T 7/277; G06T 7/292; G06T 2207/20221; G06T 2207/30181
See application file for complete search history.

(56) References Cited

U.S. PATENT DOCUMENTS 7,626,618 B2 * 12/2009 Adachi ................ H04N 5/3598
341/122
9,875,579 B2 * 1/2018 Menozzi .................. G06T 7/73

FOREIGN PATENT DOCUMENTS

KR 10-2013-0019314 A 2/2013
KR 10-2014-0142140 A 12/2014

OTHER PUBLICATIONS

Nakajima et al. "Characteristics and performance of the Improved Limb Atmospheric Spectrometer-II (ILAS-II) on board the ADEOS-II satellite." Journal of Geophysical Research: Atmospheres 111. D11 (2006).*
Chang et al. "High-accuracy image centroiding algorithm for CMOS-based digital sun sensors." Sensors, 2007 IEEE. IEEE, 2007.*
Korean Office Action dated Jun. 16, 2017 in corresponding KR Application No. 10-2016-0054442 (4 pages in Korean).

* cited by examiner

SUN POSITION TRACKING METHOD BASED ON BLACK SUN EFFECT OF IMAGE SENSOR, COMPUTER PROGRAM STORED IN MEDIUM, AND SOLAR SENSOR USING THE SAME

CROSS-REFERENCE TO RELATED APPLICATIONS

This application claims priority to Korean Patent Application No. 10-2016-0054442 filed on May 3, 2016 in Korea, the entire contents of which are hereby incorporated by reference in their entirety.

BACKGROUND OF THE DISCLOSURE

1. Field of the Disclosure

The present invention relates to a sun position tracking technique and, more specifically, to a sun position tracking technique using camera images.

2. Background of the Disclosure

There is growing interest in development of alternative energy as problems regarding reserves of fossil fuel such as coal, oil and gas and environmental pollution are magnified. Among alternative energy, solar energy has the advantages of generation of less environmental pollution or noise and infinite energy. To use solar energy, a method of converting sunlight input to solar cells into electrical energy is employed. In order to charge a large amount of electrical energy, a solar cell panel needs to be oriented toward the sun to maximize the amount of sunlight input thereto. Accordingly, various research on sun position tracking methods and apparatuses for effective collection of solar energy has been conducted.

As conventional sun position tracking methods and apparatuses, methods for capturing images of the sun using a camera and tracking a correct position of the sun through various analysis algorithms and methods for tracking a position of the sun using optical sensors have been studied.

For example, Korean Patent Publication No. 10-2014-0142140 discloses an apparatus and method for tracking the position of the sun by installing a convex lens on a sunlight shielding part to obtain focused images regarding sunlight. However, this method has a problem that a driver needs to drive the sunlight shielding part according to season and time such that sunlight is input to the convex lens.

As another example, Korean Patent Publication No. 10-2013-0019314 discloses a sun position tracking apparatus using three optical sensors for sensing the quantity light. However, the apparatus is installed at one side of a concentrator in the length direction to control a reflector depending on the sensed quality of light and thus cannot correctly track the position of the sun.

Among optical sensors for tracking the position of the sun, a micro electro mechanical system (MEMS) sensor is based on the principle of a slit in order to regenerate a model for incident light. However, since the intensity of light is measured through a lattice array of photo cells and incident light generates one point in pixels of an image sensor, one or more expensive MEMS sensors are required.

SUMMARY OF THE DISCLOSURE

Accordingly, an object of the present invention is to provide a method for tracking a position of the sun easily and correctly using a black sun effect of an image sensor, and a computer program stored in a computer readable medium and including instructions for execution of the method.

Another object of the present invention is to provide an inexpensive solar sensor through a multi-image sensor structure capable of tracking a position of the sun using the sun position tracking method based on the black sun effect of the image sensor.

According to one aspect of the present invention, a sun position tracking method based on a black sun effect of an image sensor is provided. The method includes: capturing one or more images using one or more image sensors; and processing the one or more captured images using the black sun effect. The one or more image sensors may capture a plurality of images using a plurality of image sensors for enabling position tracking irrespective of a position of the sun, and fuse a plurality of sun position estimation results on the basis of the captured images to track the position of the sun. The one or more image sensors may capture a plurality of images using a plurality of image sensors in order to fuse a plurality of sun position estimation results on the basis of the captured images to track the position of the sun with higher accuracy and reliability.

The processing of the one or more captured image using the black sun effect may include: estimating a center point of each black sun in the one or more captured images; extracting one or more solar vectors with respect to the center point of each black sun; transforming the one or more extracted solar vectors into reference coordinates; and fusing the transformed solar vectors.

The estimating of the center point of the black sun may include: acquiring an image of the sun from a plurality of images captured using a plurality of image sensors; repeatedly segmenting the image of the sun by a predefined number of times or by at least one time while varying an intensity threshold value; detecting corner points whenever the image of the sun is segmented; and obtaining the center point of black sun from the detected corner points at the final segmenting of sun image. The obtaining the center point of black sun from the detected corner points at the final segmenting of sun image may include obtaining a centroid of strong corner points corresponding to corner points detected from a final segmented image. The estimating of the center point of the black sun may further comprise estimating a strong corner point having a minimum distance from the centroid as the center point of the black sun for each of the strong corner points.

The corner points may be detected using one of Harris corner detection and a Kanade-Tomasi corner detection.

The extracting of the solar vectors may include obtaining azimuths and altitudes of the solar vectors using the following mathematical formula for representing a 2-dimensional image of the sun as a 3-dimensional vector, $$\phi = \tan^{-1}\frac{u}{fl}, \theta = \tan^{-1}\frac{-v}{fl}$$

wherein fl is a camera focal length and (u,v) is a center point of a black sun.

The transforming of the extracted solar vectors into the reference coordinates may include obtaining an initial rotation using two solar vectors represented in sensor coordinates and two solar vectors represented in the reference coordinates at two different time points and determining the average of a plurality of initial rotations calculated by changing the two different time points by a predetermined number of times as a final rotation, to thereby transform the extracted solar vectors into the reference coordinates.

The fusing or merging of the one or more solar vectors may comprise removing noise of azimuths and altitudes of the one or more solar vectors and fusing the solar vectors to calculate a final solar vector.

An extended Kalman filter may be used to remove the noise.

According to another aspect of the present invention, the present invention provides a computer program stored in a computer readable medium to track a position of the sun on the basis of a black sun effect of an image sensor, and including commands for instructing a computing system to capture one or more images using one or more image sensors and to process the captured images using the black sun effect.

According to another aspect of the present invention, there is provided a solar sensor using a sun position tracking method based on a black sun effect of an image sensor. The solar sensor includes: a sensor unit for acquiring one or more images captured using one or more image sensors installed to acquire images of the sun; and a processor for processing the one or more images using the black sun effect to track a position of the sun.

The sensor unit may acquire a plurality of images captured using a plurality of image sensors for enabling position tracking irrespective of a position of the sun, and the processor may fuse a plurality of sun position estimation results on the basis of the captured images to track the position of the sun.

The processor may include: a center point estimation module for estimating a center point of each black sun in the one or more captured images; a solar vector extraction module for extracting one or more solar vectors with respect to the center point of each black sun; a coordinate transformation module for transforming the one or more extracted solar vectors into reference coordinates; and a fusion module for fusing or merging the transformed solar vectors.

The center point estimation module may acquire an image of the sun from a plurality of images captured using a plurality of image sensors, repeatedly segment the image of the sun by a predefined number of times while varying an intensity threshold value, detect corner points whenever the image of the sun is segmented, obtain a centroid of strong corner points corresponding to corner points detected from a final segmented image, and estimate a strong corner point having a minimum distance from the centroid as the center point of the black sun for each of the strong corner points.

The corner points may be detected using one of Harris corner detection and a Kanade-Tomasi corner detection.

The solar vector extraction module may obtain azimuths and altitudes of the solar vectors using the following mathematical formula for representing a 2-dimensional image of the sun as a 3-dimensional vector, $$\phi = \tan^{-1}\frac{u}{fl}, \theta = \tan^{-1}\frac{-v}{fl}$$

wherein fl is a camera focal length and (u,v) is a center point of a black sun.

The coordinate transformation module may obtain an initial rotation using two solar vectors represented in sensor coordinates and two solar vectors represented in the reference coordinates at two different time points, and determine the average of a plurality of initial rotations calculated by changing the two different time points by a predetermined number of times as a final rotation, to thereby transform the extracted solar vectors into the reference coordinates.

The fusion module may remove noise of azimuths and altitudes of the one or more solar vectors and fuse the solar vectors to calculate a final solar vector.

An extended Kalman filter may be used to remove the noise.

According to another aspect of the present invention, there is provided a solar sensor including 6 image sensor cameras installed at positions of 6 vertexes of a virtual icosahedron such that 3 cameras capture a black sun with hemispherical coverage irrespective of a position of the sun using a minimum number of image sensor cameras, the 6 vertexes including one reference vertex and 5 vertexes neighboring the reference vertex.

According to the sun position tracking method based on the black sun effect of an image sensor of the present invention, it is possible to measure a position of the sun easily and correctly without using conventional complicated sun position tracking algorithms or expensive MEMS sensors or driving apparatuses.

Furthermore, the solar sensor of the present invention can accurately measure a direction of the sun at a fixed position and thus can be realized at a low cost. Accordingly, the solar sensor is applicable to a wide range of general applications such as sun tracking for charging solar cells.

DETAILED DESCRIPTION OF THE PREFERRED EMBODIMENTS

Figure 1:
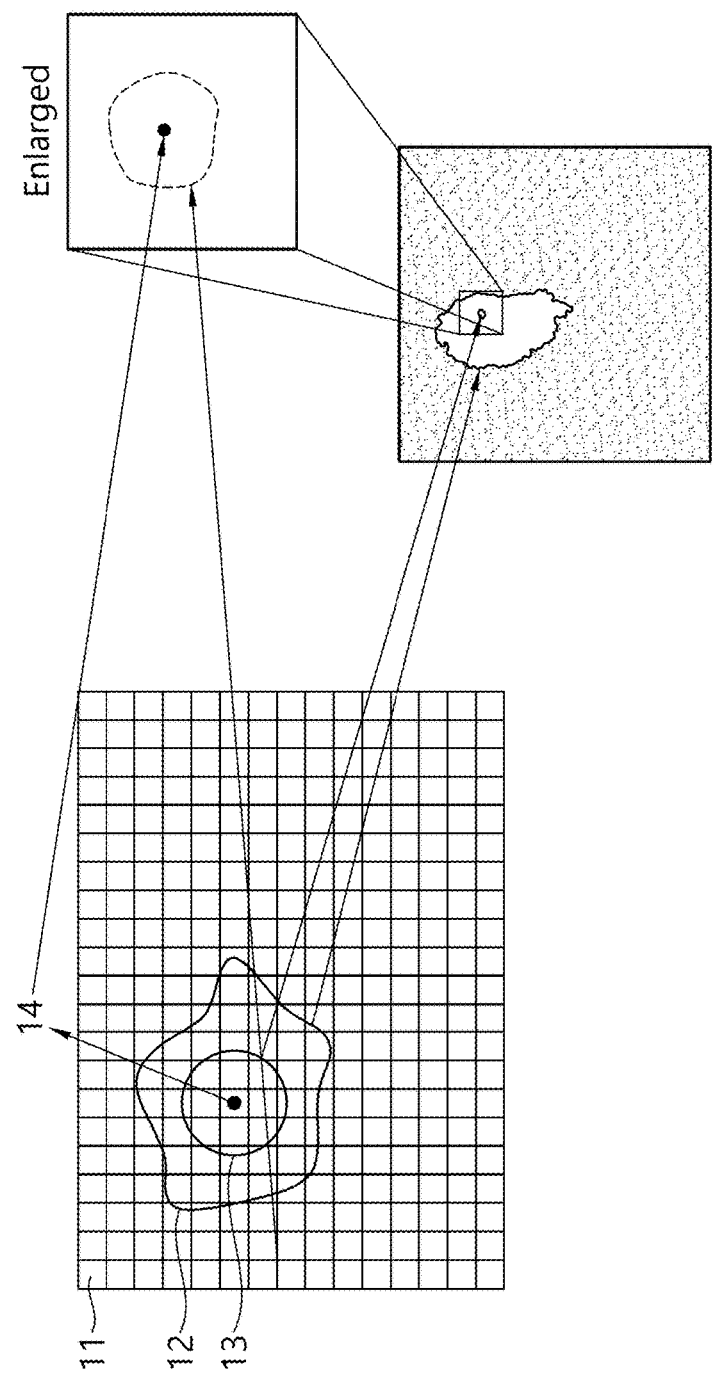
FIG. 1 illustrates a black sun effect of an image sensor.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc. may be used herein to describe various elements, these elements should not be limited by these terms. These terms are only used to distinguish one element from another element. For example, a first element could be termed a second element, and similarly, a second element may be termed a first element without departing from the teachings of the present invention. As used herein, the term "and/or" includes any and all combinations of one or more of the associated listed items It will be understood that when an element is referred to as being "connected" or "coupled" to another element, the element can be connected to the other element or intervening elements may also be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless context clearly indicates otherwise. It will be further understood that the terms "include" and "have" when used in this specification, specify the presence of stated features, integers, steps, operations, elements, and/or components, but do not preclude the presence or addition of one or more other features, regions, integers, steps, operations, elements, components, and/or groups thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless this disclosure expressly defines them so.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

The black sun effect is a phenomenon that a black spot is generated at the center of an image when the sun is photographed due to excessive exposure to the light source.

Among image sensors, for example, a CMOS image sensor converts photons input thereto into a voltage and this voltage is accumulated in pixels. A pixel value can be acquired by reading accumulated charges through a specific electric circuit.

The pixel structure of the CMOS image sensor has a function of a reset transistor to send photocharges accumulated in a photodiode to a read bus. An output signal is determined by a difference between the signal of the photodiode and a reference voltage and output through a reset transistor. The reference voltage decreases as the intensity of light increases, and thus it can be known that the reference voltage depends on incident light. Though this mechanism, the black sun effect that the output signal becomes 0 due to excessive exposure to light can be explained.

The present invention provides a sun position tracking method and a solar sensor using the black sun effect of such an image sensor (CMOS image sensor or the like).

FIG. 1 illustrates the black sun effect of an image sensor.

Referring to FIG. 1, an image sensor may include pixels in rows and columns 11 as shown at the left of the figure. A part 12 having an irregular form represents the glare of the sun generated due to diffraction and a circle 13 thereinside is the boundary of the sun which is indistinguishable. A black spot 14 inside the circle is the black sun due to excessive exposure of pixels. The lower right image is an image of the glare of the sun and the black sun region, and the upper right image (enlarged) is obtained by enlarging the indistinct boundary of the sun and the black sun region.

The present invention determines the number of image sensor (e.g., CMOS image sensor) cameras necessary to track the position of the sun as follows.

According to K-coverage sensor network algorithm, "K" needs to be equal to or greater than 2 in order to detect optimum coverage having an overlap region. However, to estimate the position of the sun more robustly and correctly on the basis of data fusion, the black sun needs to be photographed using three cameras rather than two cameras. Accordingly, the position of the sun is tracked using three cameras.

Figure 2:
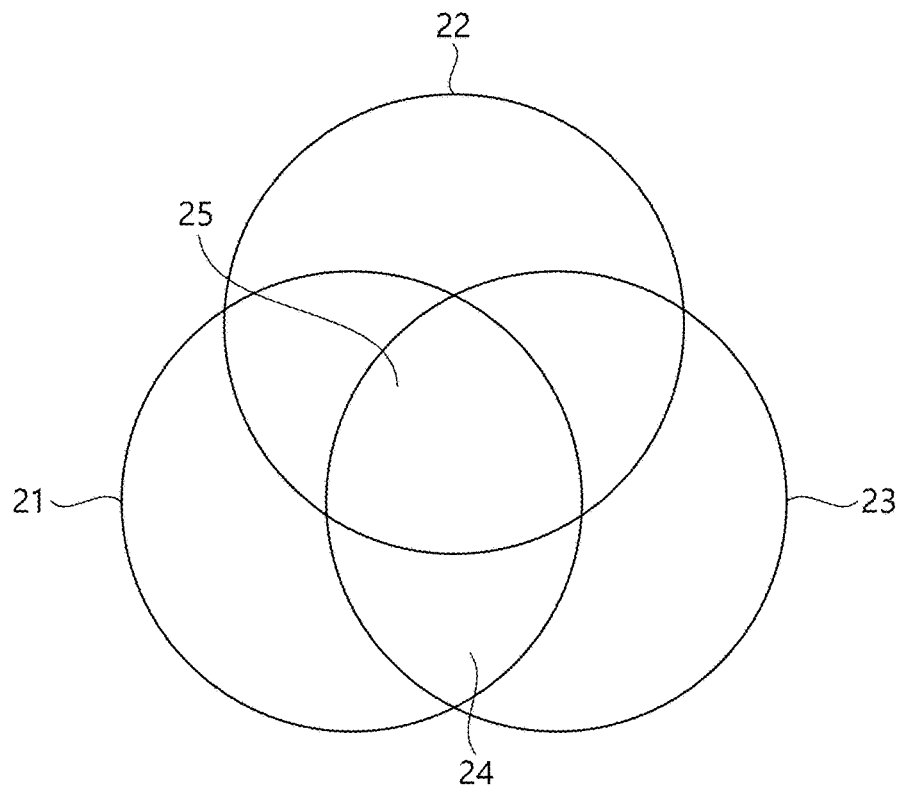
FIG. 2 illustrates coverage of image sensors of a camera according to an embodiment of the present invention.

FIG. 2 illustrates coverages of sensors of cameras according to an embodiment of the present invention.

Referring to FIG. 2, sensor coverages 21, 22 and 23 of cameras are represented as circles, and an overlap region 25 of three cameras is smaller than an overlap region 24 of two cameras and thus the position of the sun can be estimated more robustly and correctly in the overlap region 25.

To take a picture of the sun using three cameras and provide a hemispherical coverage irrespective of the position of the sun, at least six cameras are needed.

Figure 3:
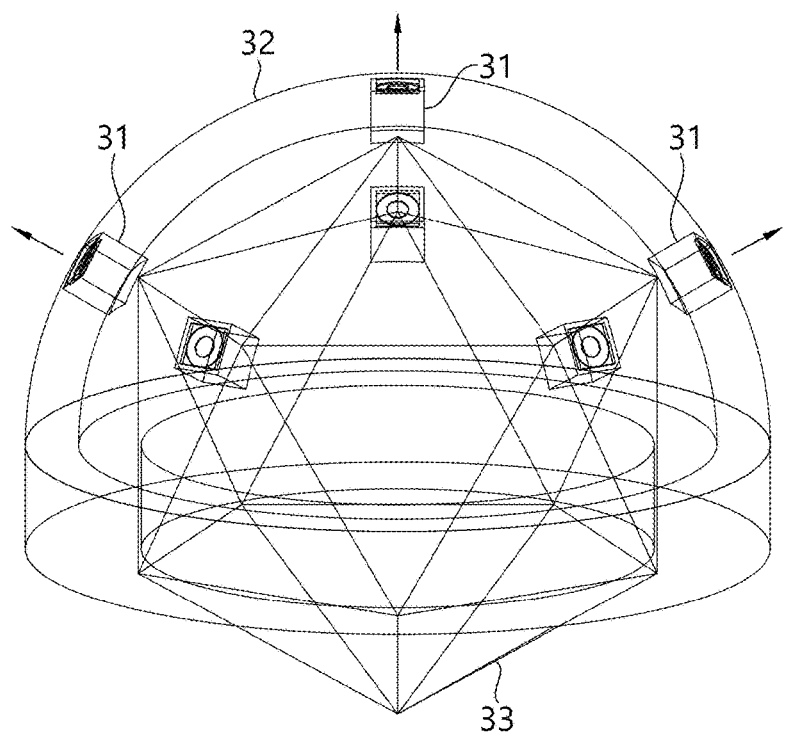
FIG. 3 illustrates a hemispherical solar sensor according to an embodiment of the present invention.

FIG. 3 illustrates a hemispherical solar sensor according to an embodiment of the present invention.

Referring to FIG. 3, six cameras 31 are installed at vertexes of an icosahedron 33. Since the cameras are installed at six vertexes (one reference vertex and five vertexes neighboring the reference vertex) at one side from among the vertexes of the icosahedron, and thus neighboring cameras have the same distance therebetween and a hemispherical coverage 32 can be obtained with a minimum number of cameras.

Figure 4:
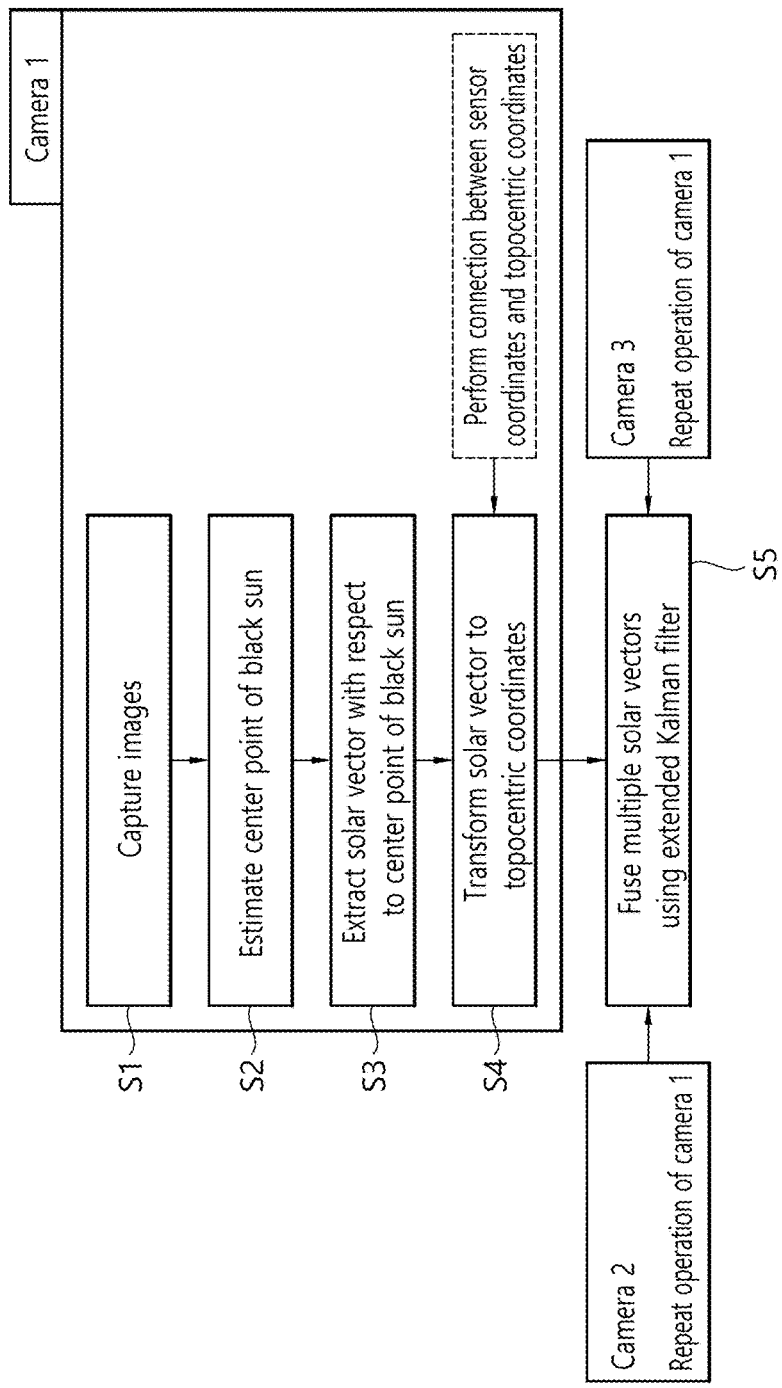
FIG. 4 is a flowchart illustrating a sun position tracking method according to an embodiment of the present invention.

FIG. 4 is a flowchart illustrating a sun position tracking method according to an embodiment of the present invention.

Referring to FIG. 4, the sun position tracking method includes a step S1 of capturing images of the sun using a camera, a step S2 of segmenting the acquired images of the sun on the basis of intensity of light and detecting strong corner points to estimate the center point of the black sun, a step S3 of extracting solar vectors with respect to the center point of the black sun, a step S4 of transforming solar vectors in sensor coordinates into topocentric coordinates, and a step S5 of fusing or merging solar vectors calculated by performing the aforementioned steps for three cameras using an extended Kalman filter.

In the step S1 of capturing images, images of the sun are captured using a plurality of installed image sensor cameras. There may be a camera that captures no image in response to a position of the sun. The following operation is performed on three best camera images.

In the step S2 of estimating the center point of the black sun, the acquired images of the sun are repeatedly segmented and corner points are extracted to estimate the center point of the sun.

Figure 5:
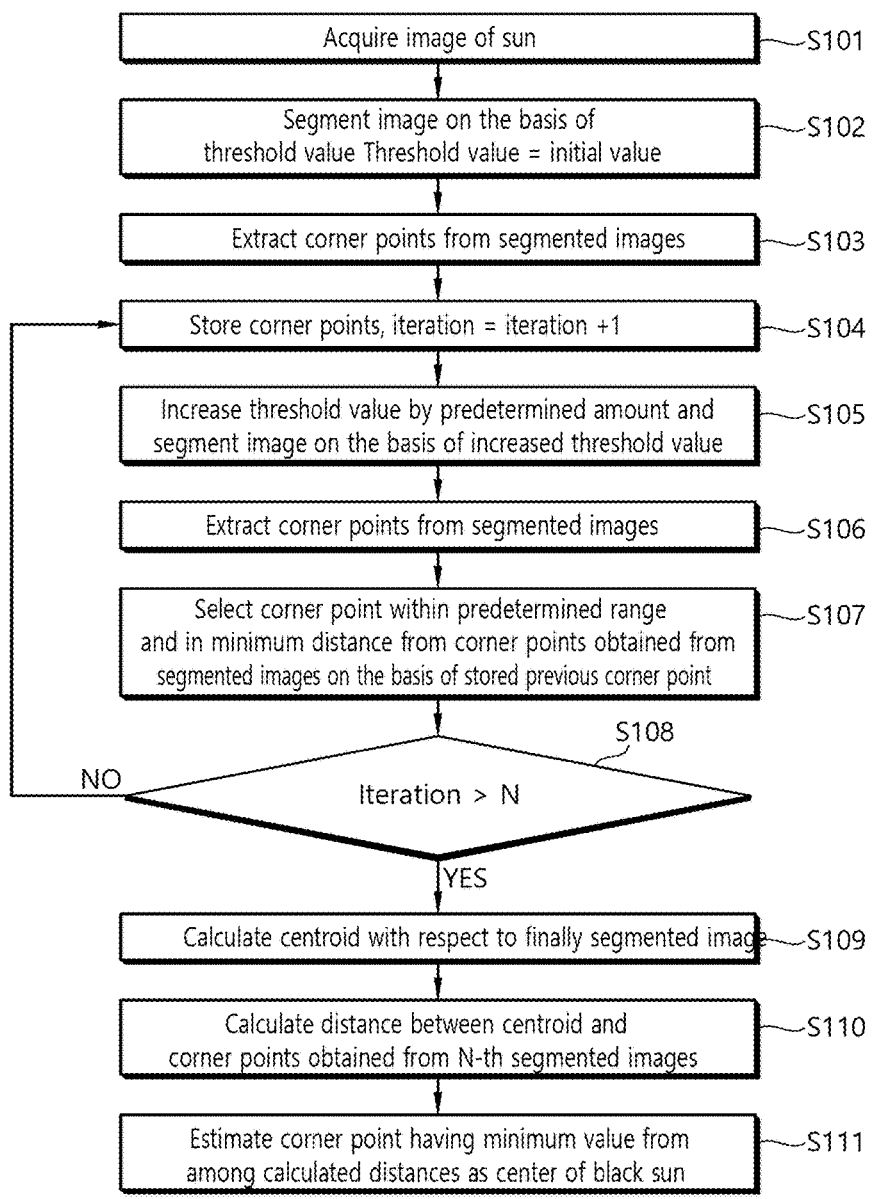
FIG. 5 is a flowchart illustrating a method of estimating a black sun center point according to an embodiment of the present invention.

FIG. 5 is a flowchart illustrating a method of estimating the center point of the black sun according to an embodiment of the present invention. Referring to FIG. 5, an image of the sun is acquired from images captured using a plurality of cameras (S101) and image segmentation is performed on the basis of an intensity threshold initial value (S102). That is, the glare part (including the black sun region) of the sun is primarily segmented from the image. Then, corner points are extracted from the segmented images (S103).

The Harris detection method and the Kanade-Tomasi (also called Shi-Tomasi) detection method, for example, can be used as a method for extracting the corner points.

A corner point detection procedure according to the Harris algorithm or the Kanade-Tomasi algorithm is as follows.

The entire image is covered with a window and a convolution matrix M (mathematical formula) is obtained in order to detect corner points.

$$M = \begin{pmatrix} \sum g_r^2 & \sum g_c g_r \\ \sum g_c g_r & \sum g_c^2 \end{pmatrix}$$ [Mathematical formula 1]

($g_r$, $g_c$: horizontal and vertical gradients at one point)

Each algorithm calculates a response value using the convolution matrix M. In the case of the Harris algorithm, a value H is calculated using mathematical formula 2 below and compared with a threshold value to detect corner points.

$H = \det(M) - k \cdot (\text{trace } M)^2$ [Mathematical formula 2]

In the case of the Kanade-Tomasi algorithm, a value KT is calculated using mathematical formula 3 and compared with a threshold value to detect corner points.

$KT = \min(\lambda_1, \lambda_2)$ [Mathematical formula 3]

($\lambda_1, \lambda_2$: eigenvalues of the convolution matrix M)

The detected corner points are stored (S104), the threshold value is increased by a predetermined amount and image segmentation is performed on the basis of the increased threshold value (S105). A segmented image decreases in size as the threshold value increases.

Corner points are extracted from the segmented images (S106).

Corner points within a predetermined range from each of previously stored corner points (in a case where two or more corner points are present within a predetermined range from one previously stored corner point) and in a minimum distance therefrom, from among the corner points newly acquired from the segmented images, are selected (S107).

The step S105 of storing extracted corner points to the step S107 of selecting corner points are repeated until the number of iterations reaches a predefined number of iterations.

It is determined whether the number of iterations exceeds the predefined number of iterations (S108). Corner points finally extracted when the number of iterations exceeds the predefined number of iterations are strong corner points.

When the strong corner points are extracted, iteration of the image segmentation and corner point extraction processes is stopped and the centroid $P_c(u_c, u_v)$ of the final segmented image is calculated using mathematical formula 4 below (S109).

$u_c \Sigma_{i=1}^{n} u_i / n$ $v_c \Sigma_{i=1}^{n} v_i / n$ [Mathematical formula 4]

(n: the number of extracted strong corner points, ($u_i, v_i$): coordinate values of the i-th strong corner point)

Distances $d_i$ between the centroid and the strong corner points obtained from the final segmented image are calculated using mathematical formula 5 below (S110).

$d_i = \sqrt{(u_c - u_i)^2 + (v_c - v_i)^2}$ [Mathematical formula 5]

A corner point having a minimum value among the calculated distances is estimated as the center point of the black sun (S111).

Figure 6A:
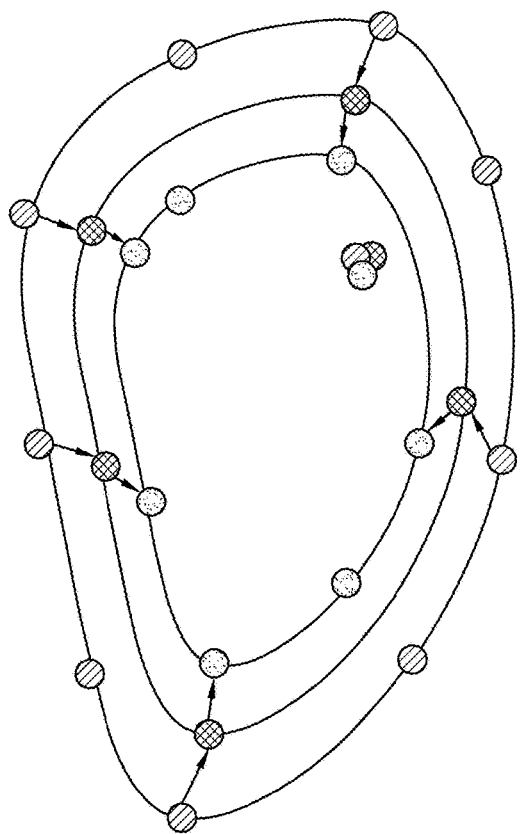
FIGS. 6a to 6c illustrate a process of estimating a center point of a black sun according to an embodiment of the present invention.
Figure 6B:
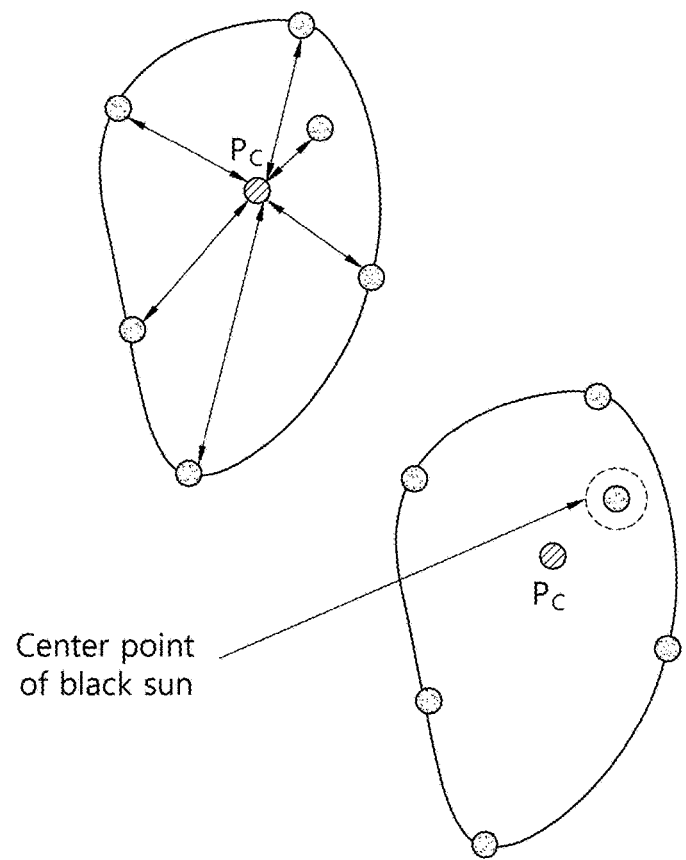
Figure 6C:
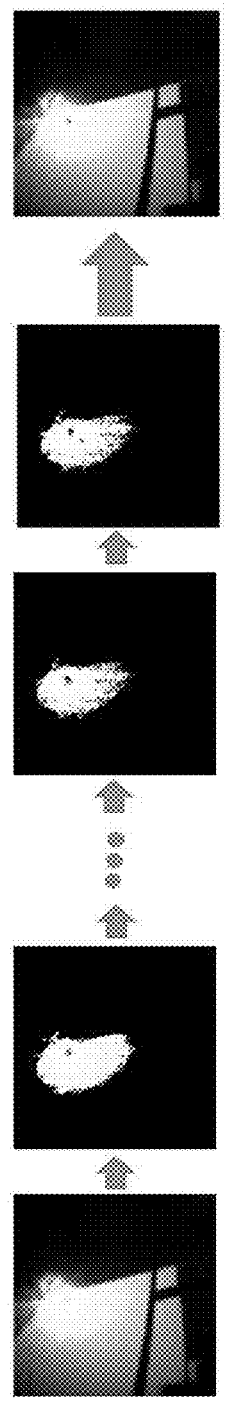

FIGS. 6a to 6c illustrate a process of estimating the center point of the black sun according to an embodiment of the present invention.

Referring to FIG. 6a, it can be confirmed that a segmented image gradually decreases in size when an image is segmented while varying an intensity threshold value.

Referring to FIG. 6b, the centroid $P_C$ can be calculated from detected strong corner points and a corner point within a minimum distance from the centroid $P_C$ can be estimated as the center point of the black sun.

FIG. 6c shows the process of obtaining the center point of the black sun according to the method of estimating the center point of the black sun shown in FIG. 5 as images. The point indicated in the rightmost image can be estimated as the center point of the black sun by repeating the process of representing an acquired image of the sun in grayscale, segmenting the image while varying a threshold value and detecting corner points.

Referring back to FIG. 4, in the step S3 of extracting solar vectors with respect to the center point of the black sun, a two-dimensional image of the sun is represented as a three-dimensional vector because an image captured using a camera is obtained by projecting points on a three-dimensional space on a two-dimensional plane.

Figure 7:
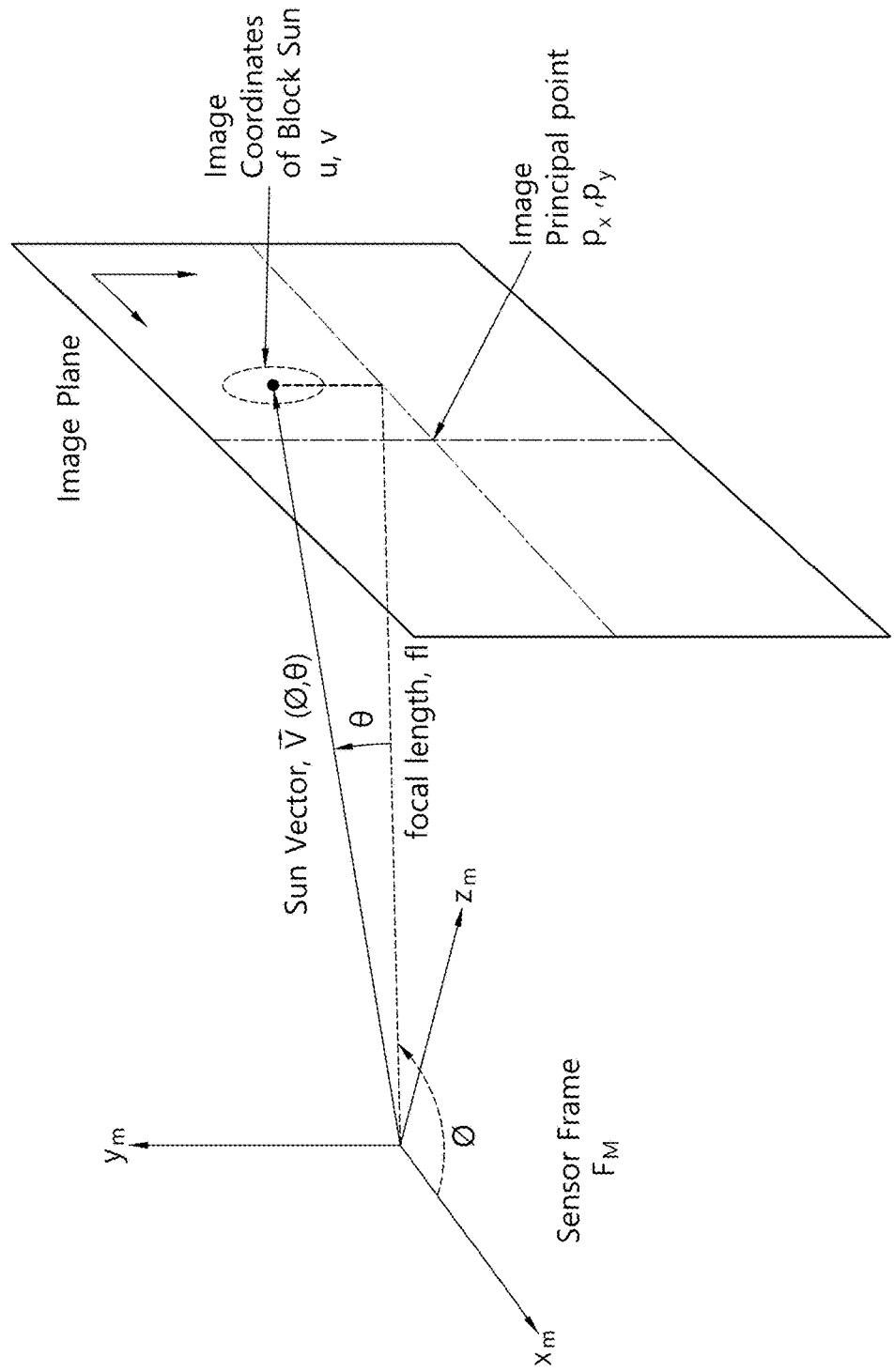
FIG. 7 illustrates extraction of a solar vector from a solar image plane according to an embodiment of the present invention.

FIG. 7 illustrates extraction of a solar vector from an image plane of the sun according to an embodiment of the present invention.

Referring to FIG. 7, a solar vector $\vec{V}$ is indicated with respect to sensor coordinates $F_M$ and represented by an azimuth Ø and an altitude θ. The sensor coordinates are identical to camera coordinates. To obtain the solar vector, a geometrical relationship between an image plane and the origin of the sensor coordinates is used. Here, the coordinates (u,v) of the center point of the black sun, focal length fl which is an internal variable of a camera, and an image principal point ($p_x, p_y$) are used as variables. The focal length is a distance between the center of a lens and an image plane, and the image principal point corresponds to coordinates of the foot of a perpendicular line from the center of the lens to the image plane.

The azimuth Ø and altitude θ of the solar vector $\vec{V}$ can be obtained using mathematical formula 6 below.

$\phi = \tan^{-1} \frac{u}{fl}, \theta = \tan^{-1} \frac{-v}{fl}$ [Mathematica formula 6]

(fl: focal length, (u,v): coordinates of the center point of the black sun)

Since the solar vector is obtained from each sensor coordinates, reference coordinates which can be commonly used for vector fusion are required. The solar vector needs to be corrected into topocentric coordinates. The solar vector obtained in step S3 is corrected into the reference coordinates, that is, topocentric coordinates. The topocentric coordinates can be acquired using latitude and longitude information obtained from a GPS.

Figure 8A:
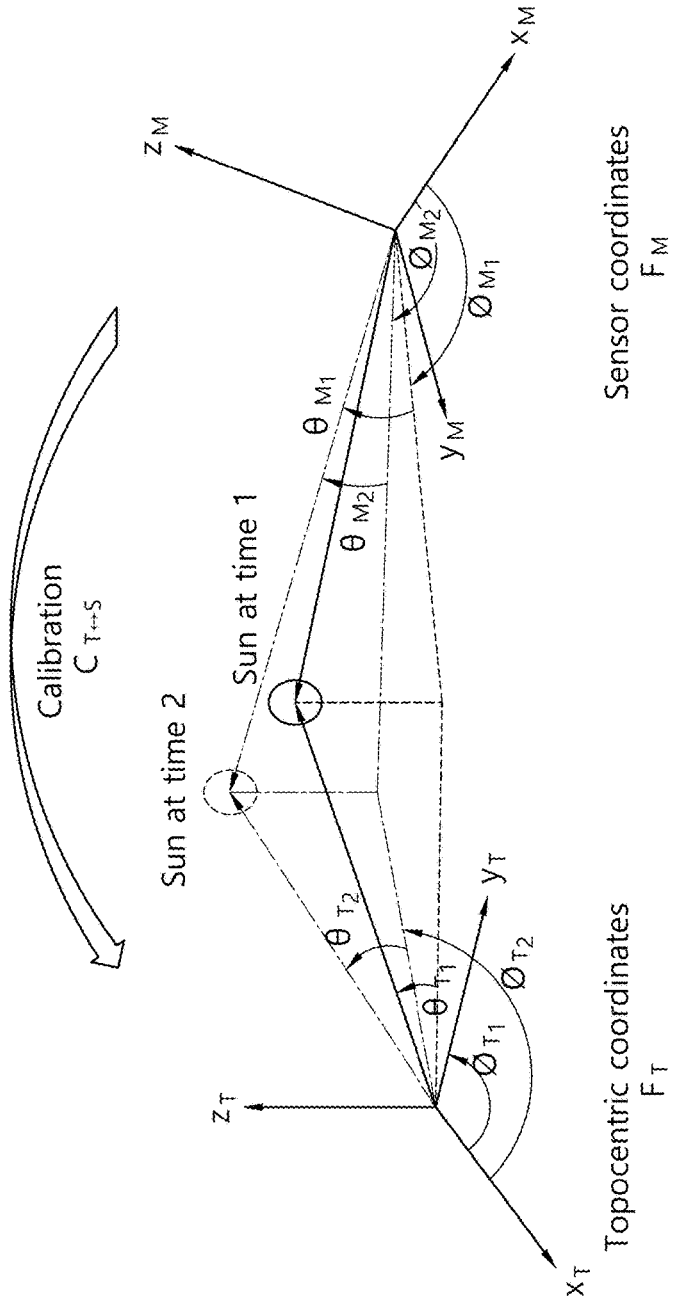
FIGS. 8a and 8b illustrate a process of correcting a solar vector from sensor coordinates to topocentric coordinates according to an embodiment of the present invention.
Figure 8B:
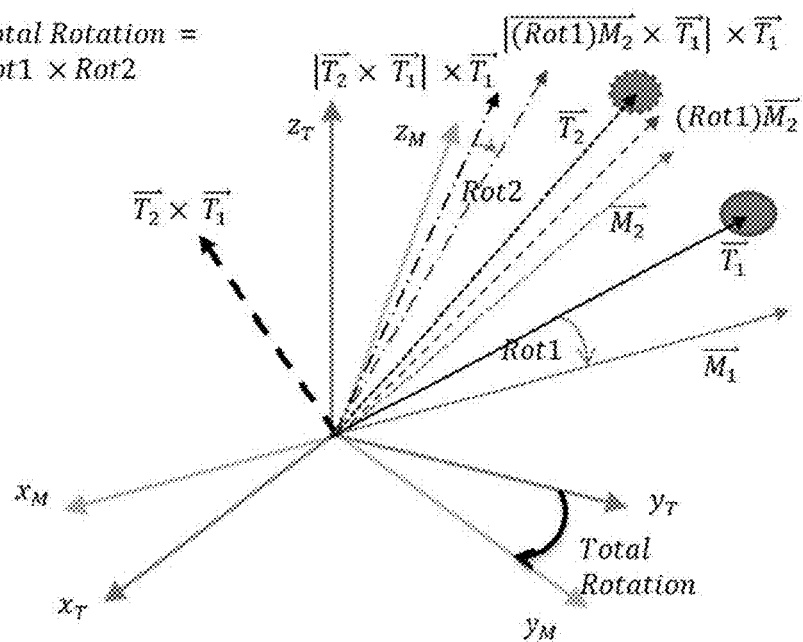

FIGS. 8a and 8b illustrate a process of correcting a solar vector from the sensor coordinates to topocentric coordinates.

Referring to FIG. 8a, the correction process is a process of obtaining a geometrical relationship (rotation or translation) between the sensor coordinates and the topocentric coordinates and the relationship is a correction model. Accordingly, when the relationship between the two coordinates is obtained, the solar vector $(\emptyset_M, \theta_M)$ represented in the sensor coordinates $F_M(F_M)$ can be transformed to a solar vector represented in the topocentric coordinates $F_T$.

For correction, solar vectors at different time points are required for the coordinates. That is, solar vectors $(\emptyset_{T_1}, \theta_{T_1})$ and $(\emptyset_{T_2}, \theta_{T_2})$ representing positions and directions of the sun at time 1 and time 2 in reference coordinates and solar vectors $(\emptyset_{M_1}, \theta_{M_1})$ and $(\emptyset_{M_2}, \theta_{M_2})$ representing them in the sensor coordinates are required.

Referring to FIG. 8b, the relationship between the two coordinates can be represented as rotation and translation. However, it is assumed that movement distances of the sensor coordinates and the reference coordinates are considerably short compared to the distance to the sun and thus can be ignored. Degrees of rotation of the sensor coordinates and the reference coordinates are obtained by applying the following algorithm.

Symbols shown in FIG. 8b are defined as follows.

$\vec{T_1}$: is a solar vector in the reference coordinates measured at time 1

$\vec{T_2}$: a solar vector in the reference coordinates measured at time 2

$\vec{M_1}$: a solar vector in the sensor coordinates measured at time 1

$\vec{M_2}$: a solar vector in the sensor coordinates measured at time 2

$\overline{(Rot1)M_2}$: $\vec{M_2}$ rotated by Rot1

First of all, the rotation angle Rot1 between $\vec{T_1}$ and $\vec{M_1}$ is calculated. Then, $|\vec{T_2}+\vec{T_1}|\times\vec{T_1}$ is calculated in order to obtain a solar vector considering restriction on the angle between consecutive two solar vectors in the reference coordinates obtained at different time points. Further, $\overline{(Rot1)M_2}$ is a vector obtained from rotation without angle restriction, and thus $|\overline{(Rot1)M_2}\times\vec{T_1}|\times\vec{T_1}$ is calculated in order to calculate an offset. Thereafter, a rotation angle Rot2 between the rotation offset $|\vec{T_2}+\vec{T_1}|\times\vec{T_1}$ generated due to angle restriction and $|\overline{(Rot1)M_2}\times\vec{T_1}|\times\vec{T_1}$ is calculated. Total rotation is obtained using mathematical formula 7 below.

$$\text{Total Rotation} = Rot1 \times Rot2 \quad \text{[Mathematical formula 7]}$$

The total rotation is used as initial rotation, an initial rotation value is calculated multiple times while varying time in order to increase accuracy, and the average of calculated initial rotation values is determined as final rotation.

Referring back to FIG. 4, in the step S5 of fusing or merging solar vectors using the extended Kalman filter, the operations S1 to S4 are performed for each of three cameras and then three solar vectors are fused to calculate a final solar vector indicating the correct position of the sun. For example, the extended Kalman filter or a particle filter can be used. Since an azimuth and an altitude measured by a solar sensor include noise, the noise is removed using the extended Kalman filter and the like. The process of removing the noise may be performed prior to the step S4 of transforming coordinates. Further, the fusion algorithm disclosed in Korean Patent Application no. 10-2015-0058160 filed by the Applicant may be used the aforementioned fusion algorithm.

The aforementioned sun position tracking method may be implemented as a program executed in a computer and stored in a computer-readable recording medium. Examples of the computer-readable recording medium include magnetic media such as a hard disk, a floppy disk and a magnetic tape, optical media such as a CD-ROM and a DVD, and hardware devices configured to store and execute program commands, such as a ROM, a RAM and flash memory.

Figure 9:
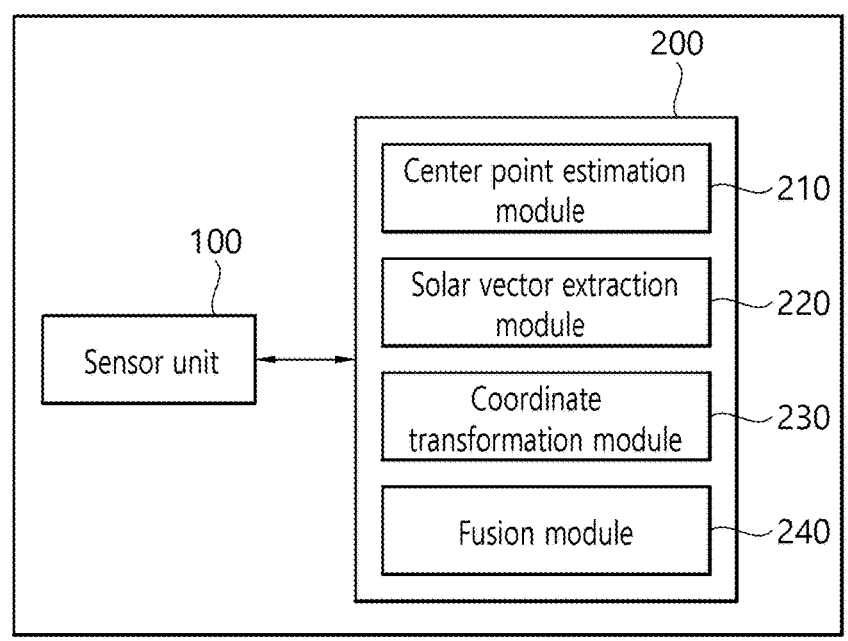
FIG. 9 is a functional block diagram of the solar cell according to an embodiment of the present invention.

FIG. 9 is a functional block diagram of a solar sensor according to an embodiment of the present invention.

Referring to FIG. 9, a solar sensor 10 includes a camera sensor unit 100 that captures an image of the sun, and a processor 200 that processes the captured image to determine a position of the sun.

The sensor unit 100 includes an image sensor (CMOS image sensor or the like) of a camera and acquires an image of the sun.

The processor 200 processes the image of the sun to track the position of the sun. The processor 200 includes a center point estimation module 210 for estimating the center point of the black sun in the captured image, a solar vector extraction module 220 for extracting a solar vector with respect to the center point, a coordinate transformation module 230 for transforming the solar vector from sensor coordinates to topocentric coordinates, and a fusion module 240 for fusing or merging solar vectors.

The center point estimation module 210 estimates the center point of the black sun in the image acquired by the sensor unit. First of all, an intensity based image segmentation and corner point extraction process is repeated for the captured image of the sun to detect strong corner points. Then, the centroid of a final segmented region is calculated using the detected strong corner points, and a strong corner point in a minimum distance from the centroid is estimated as the center point of the black sun.

The solar vector extraction module 220 represents a two-dimensional image of the sun as a three-dimensional vector. The solar vector extraction module 220 can obtain the azimuth $\emptyset$ and altitude $\theta$ of a solar vector $\vec{V}$ using coordinates (u,v) of the center point of the black sun in an image plane, a focal length fl which is a camera internal variable and an image principal point $(p_x, p_y)$.

The coordinate transformation module 230 transforms solar vectors in the sensor coordinates calculated from images captured by sensors to solar vectors in the reference coordinates, that is, the topocentric coordinates in order to fuse the solar vectors.

The fusion module 240 fuses the vectors transformed to the solar vectors in the reference coordinates, for example, using an extended Kalman filter, particle filter or the like. The fusion algorithm disclosed in Korean Patent Application No. 10-2015-0058160 filed by the Applicant may be used as a fusion algorithm. It is possible to track the position of the sun using the fused solar vector.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Embodiments of the present invention have been described. The above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein. Additionally, some aforementioned steps are independent of a sequence and thus may be performed in a different sequence from the described one.

What is claimed is:

1. A sun position tracking method, comprising:
   capturing at least one image using at least one image sensor;
   extracting solar vectors based on at least one location of at least one black spot appearing in the captured at least one image; and
   determining a position of a sun based on a rotation involving solar vectors, among the extracted solar vectors, measured at different time points,
   wherein the at least one black spot is caused by overexposure of pixels in the at least one image sensor corresponding to the at least one location of the at least one black spot in the at least one captured image.

2. The sun position tracking method according to claim 1, wherein the capturing of the at least one image enables the position of the sun to be tracked.

3. The sun position tracking method according to claim 1, wherein a plurality of sun position estimation results is fused based on the captured at least one image to track the position of the sun.

4. The sun position tracking method according to claim 1, further comprising estimating a center point of each black spot of the at least one black spot in the captured at least one image,
   wherein the extracting of the solar vectors comprises extracting the solar vectors with respect to the center point of each black spot of the at least one black spot, and
   wherein the determining of the position of the sun comprises transforming the extracted solar vectors into reference coordinates, and fusing the transformed solar vectors.

5. The sun position tracking method according to claim 4, wherein the estimating of the center point of each black spot of the at least one black spot comprises
   acquiring an image of the sun from among the captured at least one image,
   repeatedly segmenting the image of the sun while varying an intensity threshold value,
   detecting corner points, in response to the image of the sun being segmented, and
   obtaining the center point from the detected corner points at a final segmenting of the image of the sun.

6. The sun position tracking method according to claim 5, wherein
   the obtaining of the center point comprises obtaining a centroid of strong corner points corresponding to corner points detected from the final segmented image of the sun, and
   the estimating of the center point further comprises estimating a strong corner point, among the strong corner points, having a minimum distance from the centroid, as the center point.

7. The sun position tracking method according to claim 4, wherein the transforming of the extracted solar vectors into the reference coordinates comprises
   obtaining an initial rotation using the solar vectors, among the extracted solar vectors, which are represented in sensor coordinates, and other solar vectors, among the extracted solar vectors, represented in the reference coordinates, at the different time points, and
   determining an average of a plurality of initial rotations calculated by changing the different time points by a predetermined number of times as a final rotation, to transform the extracted solar vectors into the reference coordinates.

8. The sun position tracking method according to claim 4, wherein the fusing of the solar vectors comprises
   removing noise of azimuths and altitudes of the solar vectors, and
   fusing the solar vectors to calculate a final solar vector.

9. The sun position tracking method according to claim 8, wherein the removing of the noise comprises using a Kalman filter to remove the noise.

10. A non-transitory computer-readable medium storing instructions that, when executed by a processor, cause the processor to perform the method of claim 1.

11. The sun position tracking method of claim 1, wherein an intensity of light impinging on the pixels in the at least one image sensor corresponding to the at least one location of the at least one black spot in the captured at least one image is maximal compared to remaining pixels in the at least one image sensor.

12. A solar sensor, comprising:
    at least one sensor configured to capture at least one image; and
    at least one processor configured to extract solar vectors based on at least one location of at least one black spot appearing in the captured at least one image, and determine a position of a sun based on a rotation involving solar vectors, among the extracted solar vectors, measured at different time points,
    wherein the at least one black spot is caused by overexposure of pixels in the at least one image sensor corresponding to the at least one location of the at least one black spot in the captured at least one image.

13. The solar sensor according to claim 12, wherein
    the captured at least one image enables the position of the sun to be tracked, and
    the at least one processor is further configured to fuse a plurality of sun position estimation results based on the captured at least one image to track the position of the sun.

14. The solar sensor according to claim 12, wherein the at least one processor comprises
    a center point estimation module configured to estimate a center point of each black spot of the at least one black spot in the captured at least one image,
    a solar vector extraction module configured to extract the solar vectors with respect to the center point,
    a coordinate transformation module configured to transform the extracted solar vectors into reference coordinates, and
    a fusion module configured to fuse the transformed solar vectors.

15. The solar sensor according to claim 14, wherein the center point estimation module is further configured to
    acquire an image of the sun from among the captured at least one image,
    repeatedly segment the image of the sun by a predefined number of times while varying an intensity threshold value,
    detect corner points, in response to the image of the sun being segmented,
    obtain a centroid of strong corner points corresponding to corner points, among the corner points, detected from a final segmented image, and estimate a strong corner point, among the corner points, having a minimum distance from the centroid as the center point.

16. The solar sensor according to claim 14, wherein the coordinate transformation module is further configured to
obtain an initial rotation using the solar vectors, among the extracted solar vectors, which are represented in sensor coordinates, and other solar vectors, among the extracted solar vectors, represented in the reference coordinates, at the different time points, and
determine an average of a plurality of initial rotations calculated by changing the different time points by a predetermined number of times as a final rotation, to transform the extracted solar vectors into the reference coordinates.

17. The solar sensor according to claim 14, wherein the fusion module is further configured to remove noise of azimuths and altitudes of the solar vectors, and fuse the solar vectors to calculate a final solar vector.

18. The solar sensor according to claim 17, wherein the noise is removed using an extended Kalman filter.

19. The sun position tracking method of claim 12, wherein the at least one image sensor comprises six image sensor cameras installed at six vertexes of a virtual icosahedron to enable three of the six image sensor cameras to capture a black sun with hemispherical coverage irrespective of the position of the sun, and
the six vertexes include one reference vertex and five vertexes neighboring the reference vertex.

20. A sun position tracking method based on a black sun effect of an image sensor, comprising:
capturing one or more images using one or more image sensors; and
processing the captured one or more images using the black sun effect, comprising
estimating a center point of each black sun in the captured one or more images,
extracting solar vectors with respect to the center point of each black sun,
obtaining an initial rotation using two solar vectors represented in sensor coordinates and two solar vectors represented in reference coordinates at two different time points,
determining an average of a plurality of initial rotations calculated by changing the two different time points by a predetermined number of times as a final rotation, to transform the extracted solar vectors into the reference coordinates, and
fusing the transformed solar vectors.

* * * * *